United States Patent
Kim et al.

(10) Patent No.: US 11,108,272 B2
(45) Date of Patent: Aug. 31, 2021

(54) ELECTRONIC APPARATUS

(71) Applicant: SAMSUNG ELECTRONICS CO., LTD., Suwon-si (KR)

(72) Inventors: Moonyoung Kim, Suwon-si (KR); Jeongil Kang, Suwon-si (KR); Shinwook Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/458,306

(22) Filed: Jul. 1, 2019

(65) Prior Publication Data

US 2020/0014243 A1  Jan. 9, 2020

(30) Foreign Application Priority Data

Jul. 9, 2018  (KR) .................. 10-2018-0079531

(51) Int. Cl.
| | |
|---|---|
| *H02J 7/00* | (2006.01) |
| *B60L 11/18* | (2006.01) |
| *H02J 50/12* | (2016.01) |
| *H02J 50/90* | (2016.01) |
| *H01F 38/14* | (2006.01) |
| *H02M 1/42* | (2007.01) |
| *H04N 5/63* | (2006.01) |
| *H02M 3/335* | (2006.01) |
| *H02J 7/02* | (2016.01) |

(52) U.S. Cl.
CPC .............. *H02J 50/12* (2016.02); *H01F 38/14* (2013.01); *H02J 50/90* (2016.02); *H02M 1/4208* (2013.01); *H02M 3/33569* (2013.01); *H04N 5/63* (2013.01); *H02J 7/025* (2013.01)

(58) Field of Classification Search
CPC .... H02J 50/90; H02J 50/12; H02J 7/02; H02J 7/025; H02M 3/33569; H02M 1/4208; H02M 3/33576; H02M 2001/0058; H04N 5/63; H01F 38/14
See application file for complete search history.

(56) References Cited

U.S. PATENT DOCUMENTS 9,476,736 B2 * 10/2016 Arisawa .................. H02J 7/025
9,853,507 B2  12/2017 Jol et al.
(Continued)

FOREIGN PATENT DOCUMENTS

| EP | 2 843 801 A1 | 3/2015 |
| EP | 3 151 371 A1 | 4/2017 |

(Continued)

OTHER PUBLICATIONS

International Search Report (PCT/ISA/210) and Written Opinion (PCT/ISA/237) dated Nov. 8, 2019 issued by the International Searching Authority in International Application No. PCT/KR2019/008379.

(Continued)

*Primary Examiner* — Jared Fureman
*Assistant Examiner* — Esayas G Yeshaw
(74) *Attorney, Agent, or Firm* — Sughrue Mion, PLLC

(57) ABSTRACT

An electronic apparatus including a power transfer module configured to wirelessly transfer power to a power receiver and a controller configured to control the power receiver to transfer power based on voltage applied from the power transfer module to the power receiver.

15 Claims, 22 Drawing Sheets

(56) References Cited

U.S. PATENT DOCUMENTS

| | | | |
|---|---|---|---|
| 10,607,761 B2* | 3/2020 | Nishimura | H01F 27/06 |
| 2008/0267318 A1* | 10/2008 | Ihm | H04B 7/0671 |
| | | | 375/299 |
| 2013/0187598 A1* | 7/2013 | Park | H02J 7/0042 |
| | | | 320/108 |
| 2014/0035379 A1* | 2/2014 | Stevens | H02J 7/0013 |
| | | | 307/104 |
| 2015/0008755 A1 | 1/2015 | Sone | |
| 2015/0077048 A1* | 3/2015 | Bae | H02J 7/008 |
| | | | 320/108 |
| 2015/0303714 A1* | 10/2015 | Keeling | B60L 53/122 |
| | | | 320/108 |
| 2015/0318709 A1 | 11/2015 | Jol et al. | |
| 2017/0005519 A1* | 1/2017 | Lee | H01F 27/006 |
| 2017/0098965 A1* | 4/2017 | Kikuchi | H02J 50/10 |
| 2017/0101016 A1 | 4/2017 | Seong et al. | |
| 2017/0141604 A1 | 5/2017 | Park et al. | |
| 2017/0163098 A1 | 6/2017 | Ahn et al. | |
| 2017/0331334 A1 | 11/2017 | Park | |
| 2017/0373523 A1 | 12/2017 | Kwon et al. | |
| 2018/0019619 A1 | 1/2018 | Olyunin et al. | |
| 2018/0041075 A1* | 2/2018 | Kaechi | H02J 7/00034 |
| 2018/0054086 A1 | 2/2018 | Jung | |
| 2018/0054090 A1 | 2/2018 | Von Novak, III et al. | |
| 2018/0198375 A1* | 7/2018 | Xu | H02M 3/3376 |
| 2018/0351467 A1* | 12/2018 | Son | B60L 53/22 |
| 2019/0058393 A1* | 2/2019 | Elferich | H05B 45/39 |
| 2019/0157978 A1* | 5/2019 | Ni | H02M 3/33569 |

FOREIGN PATENT DOCUMENTS

| | | |
|---|---|---|
| JP | 2001-218391 A | 8/2001 |
| JP | 2013-532461 A | 8/2013 |
| JP | 2015-012761 A | 1/2015 |
| JP | 2015-149803 A | 8/2015 |
| KR | 10-2016-0011143 A | 1/2016 |
| KR | 10-2016-0121347 A | 10/2016 |
| KR | 10-2017-0042944 A | 4/2017 |

OTHER PUBLICATIONS

Communication dated Dec. 7, 2020 by the European Patent Office in counterpart European Patent Application No. 19833068.0.

* cited by examiner

ELECTRONIC APPARATUS

CROSS-REFERENCE TO RELATED APPLICATION(S)

This application claims priority under 35 U.S.C. § 119 to Korean Patent Application No. 10-2018-0079531 filed on Jul. 9, 2018, in the Korean Intellectual Property Office, the disclosure of which is incorporated by reference herein in its entirety.

BACKGROUND

Field

Apparatuses and methods consistent with the embodiments relate to an electronic apparatus, and more particularly to an electronic apparatus receiving power by a wireless power transfer.

Description of the Related Art

With development of technology, many different kinds of household electronic apparatuses have been developed, and the number of household electronic apparatuses is rising. Commonly, the electric cords and cables of household electronic become tangled up together. Accordingly, user frustration, visual unsightliness, and increased fire hazard may occur when numerous electric cords and cables are provided with respect to nearby positioned household electronic devices.

Accordingly, a cordless television (TV) has been proposed that receives power through a wireless power transfer system. Thereby, at least some cords and cables of the cordless TV may be omitted.

The wireless power transfer system includes a transmitter that wirelessly transmits commercially supplied power, and a receiver that transfers power wirelessly received from the transmitter to a load such as a display.

The wireless power transfer system generally applied to the TV and other electronic apparatuses may include an element for feeding information from the receiver back to the transmitter in addition to the transmitter and the receiver so that power can be properly transferred to a load.

Because wired feedback control is structurally impossible for the wireless power transfer system, the feedback control is performed through Wi-Fi, Bluetooth or another wireless communication module.

However, it is difficult to design the wireless communication module for feedback control because a communication or calculation delay should be taken into account, and power may not be normally supplied to the electronic apparatus as feedback is not properly performed when communication failure occurs.

Further, a problem of increasing costs arises because separate wireless communication modules for feedback control are additionally provided at both the transmitter and the receiver, and the receiver further needs battery power for supplying standby power to a wireless communication module.

SUMMARY

According to an embodiment of the disclosure, there is provided an electronic apparatus including a power transfer module configured to be attached to a main body of the electronic apparatus, and configured to receive alternating current (AC) power and wirelessly transfer power to the electronic apparatus, the power transfer module including a primary resonator configured to operate at an operation frequency of a preset range corresponding to a resonant frequency, a power receiver comprising a secondary resonator configured to resonate with the primary resonator and wirelessly receive power from the power transfer module, and a controller configured to control the power receiver to transfer power to the electronic apparatus based on voltage being greater than or equal to a preset level applied from the power transfer module to the power receiver.

The frequency of the preset range may correspond to a spread frequency band based on a spread spectrum of the resonant frequency.

The primary resonator and the secondary resonator may include LLC resonant converters.

The power transfer module may include: an inverter configured to operate at the frequency of the preset range and transfer power to the primary resonator; and a setting portion configured to output a signal for setting the operation frequency to the inverter.

The inverter may include a plurality of switching devices configured to perform a switching operation based on the signal output from the setting portion, and control the primary resonator to resonate based on the switching operation.

The setting portion may be configured to detect a resonance current of the primary resonator, and control the operation of the inverter to be stopped based on detected overcurrent being greater than or equal to a preset level.

The power transfer module may further include an input portion configured to convert the AC power into direct current (DC) power by adjusting a power factor, and output the DC power to the inverter.

The power receiver may include a rectifying unit configured to convert the AC power received from the primary resonator of the power transfer module into direct current (DC) power to be supplied to the electronic apparatus.

The controller may include: a detector configured to detect voltage output from the rectifying unit; and a switch configured to perform switching based on the voltage output from the rectifying unit being greater than or equal to the preset level.

The primary resonator and the secondary resonator are respectively provided at opposite positions inside external casings of the power transfer module and a main body of the electronic apparatus.

The power transfer module may further include an operation detector configured to detect whether the secondary resonator is disposed at a position opposite to the primary resonator.

The operation detector may include a magnetic switch or a light receiving element of a photosensor.

The each of the power transfer module and the power receiver may include a position alignment member configured to make a relative position between the primary resonator and the secondary resonator be within a preset range when the power transfer module is mounted to the main body.

The position alignment member may include a magnet.

The each of the primary resonator and the secondary resonator may include a core and a wiring, and one of the primary resonator and the secondary resonator comprises a core larger than a core of another of the primary resonator and the secondary resonator.

BRIEF DESCRIPTION OF THE DRAWINGS

The above and/or the aspects will become apparent and more readily appreciated from the following description of embodiments, taken in conjunction with the accompanying drawings, in which.

DETAILED DESCRIPTION OF EMBODIMENTS

Figure 1:
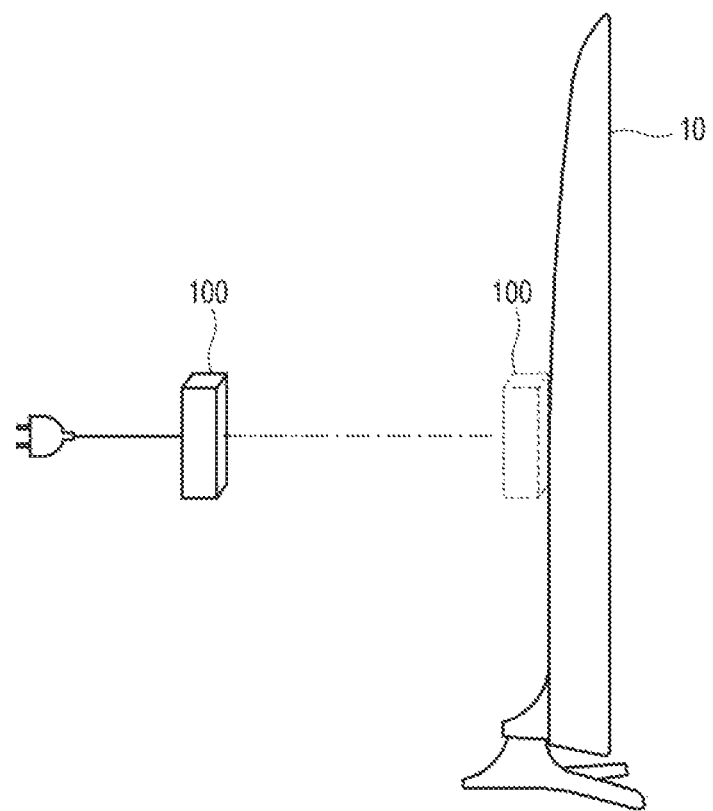
FIG. 1 illustrates an electronic apparatus according to an embodiment of the disclosure.

Below, embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the disclosure and the key configurations and functions. In the following descriptions, details about publicly known functions or features will be omitted to avoid obscuring embodiments of the disclosure.

In the following embodiments, terms 'first', 'second', etc. are only used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

An aspect of the disclosure is to provide an electronic apparatus that stably receives power by wireless power transfer without a separate feedback means.

Further, an aspect of the disclosure is to provide an electronic apparatus that prevents current stress from increasing even though voltage having a low level is supplied while consumption power is equally transferred by wireless power transfer.

Further, an aspect of the disclosure is to provide an electronic apparatus that performs wireless power transfer by sensing proximities of a transmitter and a receiver.

Further, an aspect of the disclosure is to provide an electronic apparatus that supports automatic alignment between a transmitter and a receiver, or enables wireless power transfer even though the transmitter and the receiver are partially misaligned.

FIG. 1 illustrates an electronic apparatus according to an embodiment of the disclosure.

As shown in FIG. 1, the electronic apparatus according to an embodiment of the disclosure includes an main body 10 including an electronic component (or electronic device) such as a display (see '400' in FIG. 2) or the like and a power transfer module 100 mountable or detachable to and from the main body 10 and receiving alternating current (AC) power and wirelessly transferring the AC power to the main body 10.

The power transfer module 100 has a casing to form an outer appearance in the form of a bracket detachably mountable to the back of the main body 10, and receives AC power through a wall at a house, an office or the like. The casing of the power transfer module 100 is internally provided with elements for receiving the AC power and wirelessly transferring the received AC power to the main body 10.

According to the foregoing embodiment of the disclosure, the power transfer module 100 serves as a power transmitter (hereinafter, referred to as a transmitter or a transferring terminal) for providing the wireless power transfer to the main body 10 of the device.

Figure 2:
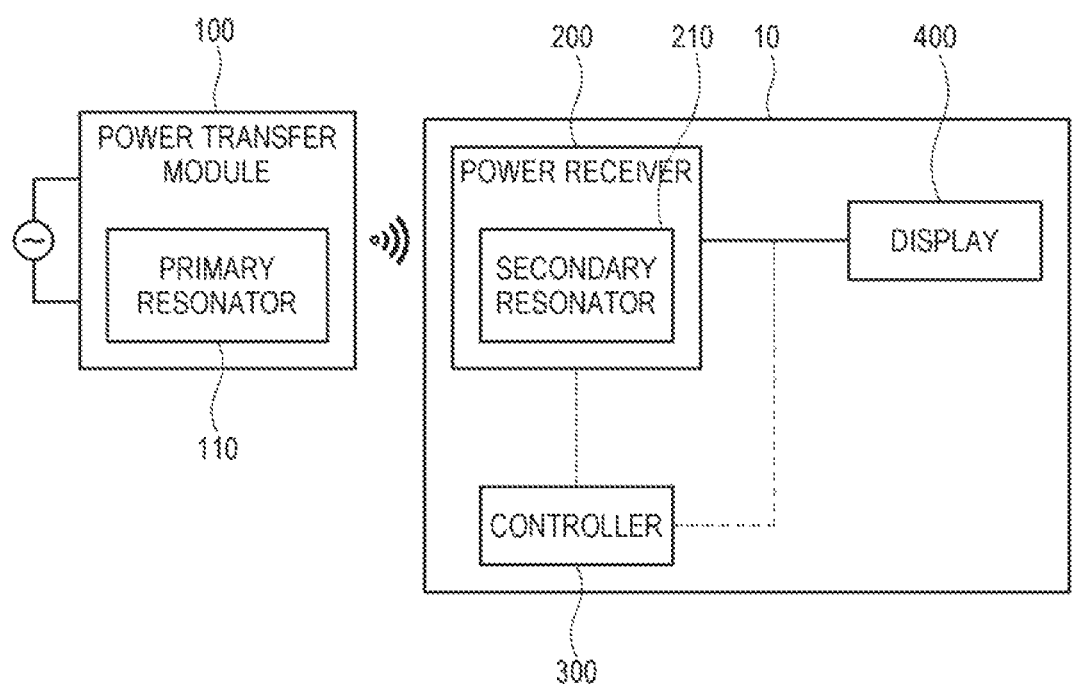
FIGS. 2 and 3 are block diagrams of an electronic apparatus according to an embodiment of the disclosure.

Referring to FIGS. 1 and 2, the main body 10 includes a power receiver (see '200' in FIG. 2) (hereinafter, referred to as a receiver or a receiving terminal) for receiving power from the power transfer module 100, i.e. the power transmitter by the wireless power transfer. The power receiver 200 is installed inside or outside of a frame, i.e., a case forming the outer appearance of the main body 10.

According to an embodiment, as shown in FIG. 1, the electronic apparatus includes a display apparatus such as a television (TV) for processing a broadcast image based on at least one among a broadcast signal, broadcast information or broadcast data received from a transmitter of a broadcasting station or any other source providing a signal to be displayed on the TV.

The display apparatus may for example wirelessly receive a radio frequency (RF) signal transmitted from the broadcasting station, i.e. a broadcast signal. To this end, the display apparatus 100 may include an antenna to obtain the broadcast signal, and a tuner to be tuned to each individual channel for the broadcast signal. The broadcast signal may be received in the display apparatus 200 through a ground wave, a cable, a satellite, etc. and a signal source in the disclosure is not limited to the broadcasting station. In other words, a set-top box, a player for an optical disc such as a Blu-ray or a digital versatile disc, etc., and the like any apparatus or station capable of transceiving or relaying data may be included in the signal source of the disclosure.

A signal received in the electronic apparatus may be configured by various methods, protocols, and standards corresponding to its types, and for example, an image signal may be received by wires based on a high definition multimedia interface (HDMI), composite video, component video, super video, syndicat des constructeurs d'appareils radiorécepteurs et téléviseurs (SCART), and the like. Further, the display apparatus 100 may wirelessly receive an image signal through Wi-Fi, Wi-Fi direct, Bluetooth or the like wireless communication.

According to an embodiment, the electronic apparatus actualized by the display apparatus may operate as a smart TV or Internet protocol (IP) TV. The smart TV refers to a TV that is capable of obtaining and displaying a broadcast signal in real time, has a web browsing function so that various pieces of content can be searched and consumed through the Internet while the broadcast signal is displayed in real time, and provides a convenient user environment for the web browsing function. Further, the smart TV may include an open-source software platform and thus provides an interactive service to a user. Accordingly, the smart TV may provide a user with various pieces of content, for example, an application or widget for providing a predetermined service through the open-source software platform. Such an application or widget refers to an application program for providing various kinds of service, and may for example include applications for providing services such as social network service, finance, news, weather, a map, music, a movie, a game, an electronic book, etc.

However, the electronic apparatus of the disclosure is not limited to the TV or the like display apparatus, but may include various apparatuses including a mobile apparatuses such as a smartphone; a tablet computer or the like smartpad; a smartwatch, a head mounted display (HMD) or the like wearable device; a personal computer (PC) such as a laptop computer or a desktop computer (or a monitor connected to a computer main body), etc., or in general any type of apparatus that operates according to receiving power necessary for operation thereof. In other words, any apparatus capable of wirelessly receiving power from the power transfer module 100 and configured to receive the AC power may be included in the electronic apparatus of the disclosure. For example, a mobile apparatus, of which a battery is wirelessly charged with power from the power transfer module 100, may be included in the electronic apparatus of the disclosure.

In the electronic apparatus according to an embodiment of the disclosure, wireless power transfer is achieved by an inductive coupling method that a magnetic field oscillating at a predetermined frequency is generated at the transmitter 100 and energy (power) is transferred to the receiver. To this end, the power transfer module 100 includes a primary resonator (see '110' in FIG. 2) for generating the magnetic field, and the power receiver 200 of the main body 10 includes a secondary resonator (see '210' in FIG. 2) for receiving the power.

Below, detailed configurations of the electronic apparatus according to an embodiment of the disclosure will be described with reference to the accompanying drawings.

Figure 3:
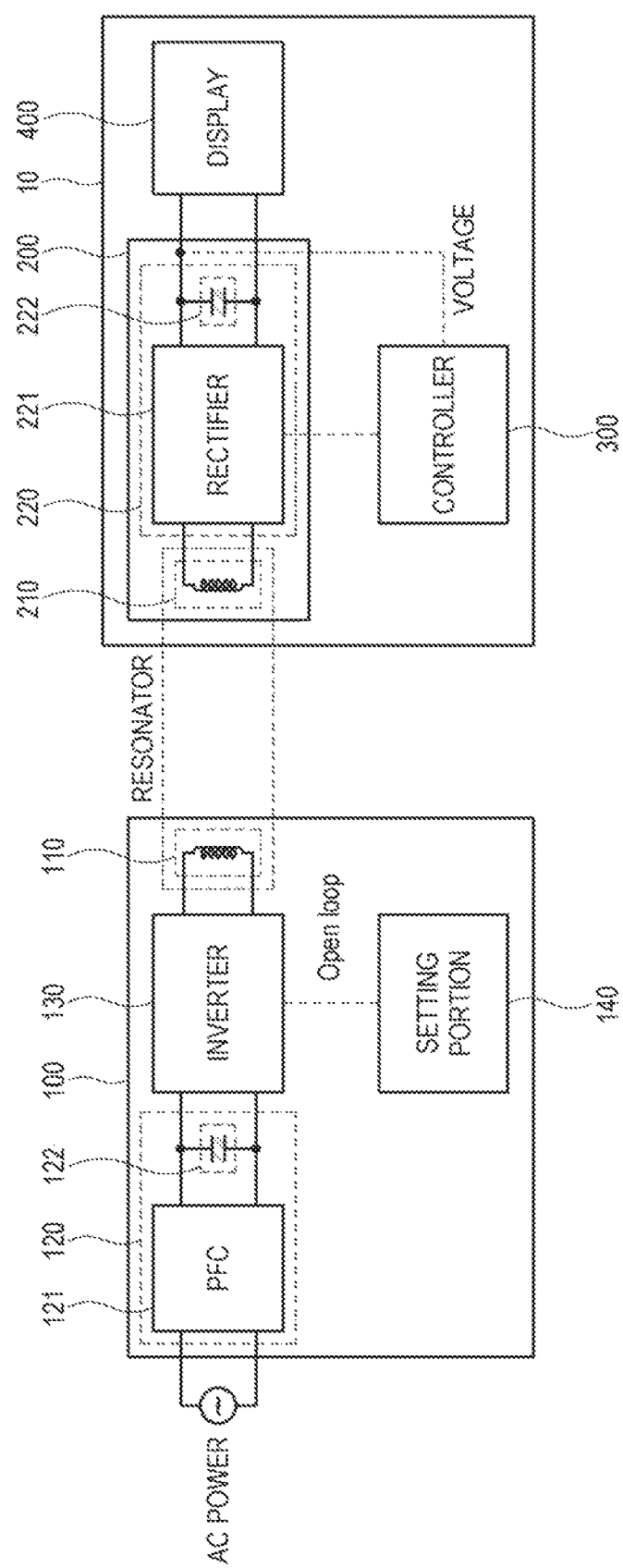

FIGS. 2 and 3 are block diagrams of an electronic apparatus according to an embodiment of the disclosure.

As shown in FIGS. 2 and 3, the electronic apparatus according to an embodiment of the disclosure includes a primary resonator (hereinafter, referred to as a Tx resonator or a transmitter resonator) 110 provided in the power transfer module 100, and a secondary resonator (hereinafter, referred to as an Rx resonator or a receiver resonator) 210 provided in the power receiver 200 of the main body 10. The primary resonator 110 and the secondary resonator 210 constitute a transformer that transfers power from the transmitter 100, 110 to the receiver 200, 210. In this disclosure, the term 'resonator' may refer to one or both of the primary resonator 110 and the secondary resonator 210.

Figure 4:
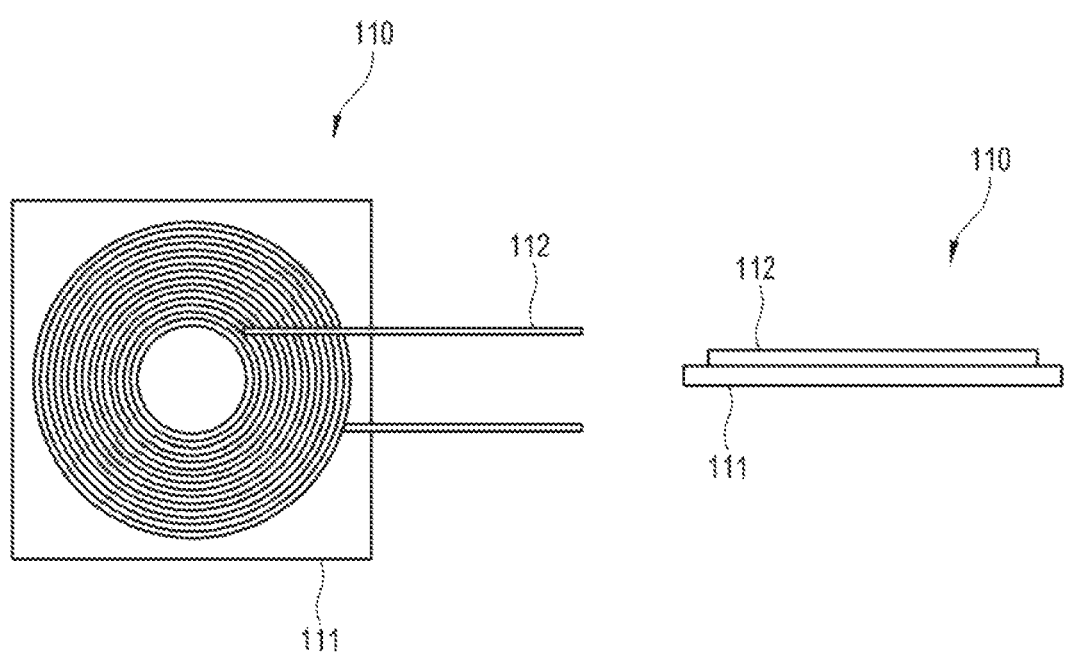
FIGS. 4 and 5 illustrate examples of a resonator provided in an electronic apparatus according to an embodiment of the disclosure.
Figure 5:
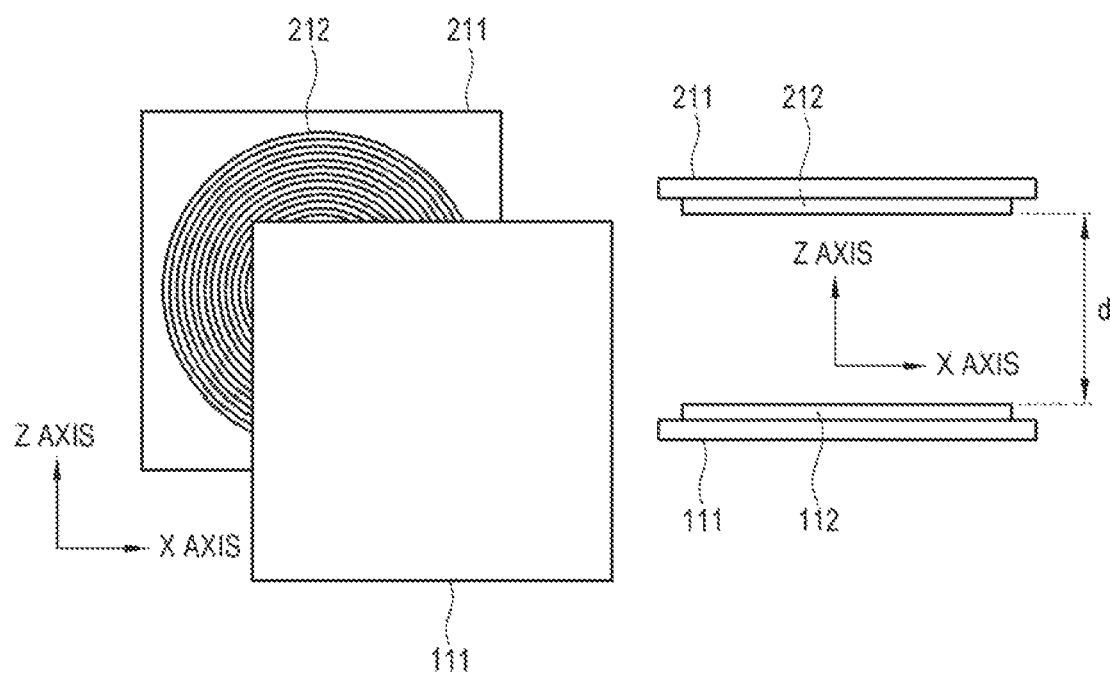

FIGS. 4 and 5 illustrate examples of a resonator provided in an electronic apparatus according to an embodiment of the disclosure.

As shown in FIG. 4, the resonator 110 includes a core 111 and a wiring 112, i.e. a coil wound on the core 111. There are no limits to the material and shape of the core 111 and the wiring 112. For example, the wiring 112 may be a copper conductive wire wound to have a coil shape.

FIG. 4 shows a plain view and a lateral view of the primary resonator 110 by way of example. The secondary resonator 210 may correspond to the primary resonator 110 of FIG. 4. However, the primary resonator 110 and the secondary resonator 210 of the disclosure may not have the same shape. Alternatively, the primary resonator 110 and the secondary resonator 210 may be designed or manufactured to have different shapes.

As shown in FIG. 5, the wirings 112 and 212 of the primary resonator 110 and the secondary resonator 210 are spaced apart at a previously designed distance d in a Z-axial direction and arranged to face with each other.

The primary resonator 110 and the secondary resonator 210 are provided to face each other inside their respective exterior casings covering them (i.e. the casing of the power transfer module 100 and the casing of the main body 10), while having a structure to be naturally spaced apart from each other by the thickness of each exterior casing. Accordingly, the primary and secondary resonators are naturally spaced apart from each other by the thickness of each external casing, thereby enabling the wireless power transfer based on the resonance.

Referring to FIG. 3, the power transfer module 100 further includes an input portion 120 configured to receive commercial power, i.e. AC power; an inverter 130 configured to convert the input commercial power into a power signal having a high frequency at which wireless power transfer is possible; and a setting portion 140 configured to set an operation frequency so that the primary resonator 110 can operate at the preset frequency corresponding to the resonant frequency.

The input portion 120 may, as shown in FIG. 3, include a power factor corrector (PFC) 121 configured to convert the AC power into direct current (DC) power by adjusting a power factor (PF), and a capacitor 122 configured to store the power output from the PFC 121. According to an embodiment, the PFC 121 may include a noise filter to filter out noise from the input AC power.

The inverter 130 converts the DC power output from the input portion 120 into the AC power, so that the converted AC power can be supplied to the primary resonator 110. The inverter 130 is actualized by an inverter circuit including a plurality of switching devices, so that AC power can be supplied to the primary resonator 110 in response to their switching operations.

According to an embodiment, the inverter 130 operates under open loop control by the preset frequency (i.e. the operation frequency), so that the primary resonator 110 and the secondary resonator 210 can resonate with each other, thereby supplying power from the primary resonator 110 to the secondary resonator 210. Here, the preset frequency may be identified corresponding to a resonant frequency of an LLC resonant converter (to be described later), as a frequency within a preset range or a frequency having a fixed value.

In the electronic apparatus according to an embodiment, an LLC resonant converter (hereinafter, referred to as an LLC converter) may be used as the resonator including the primary resonator 110 and the secondary resonator 210. However, the resonator applied to the electronic apparatus of the disclosure is not limited to the LLC resonant converter, but may be actualized by one of various converters, for example, a flyback converter, a forward converter, etc. derivable from the LLC resonant converter.

Figure 6:
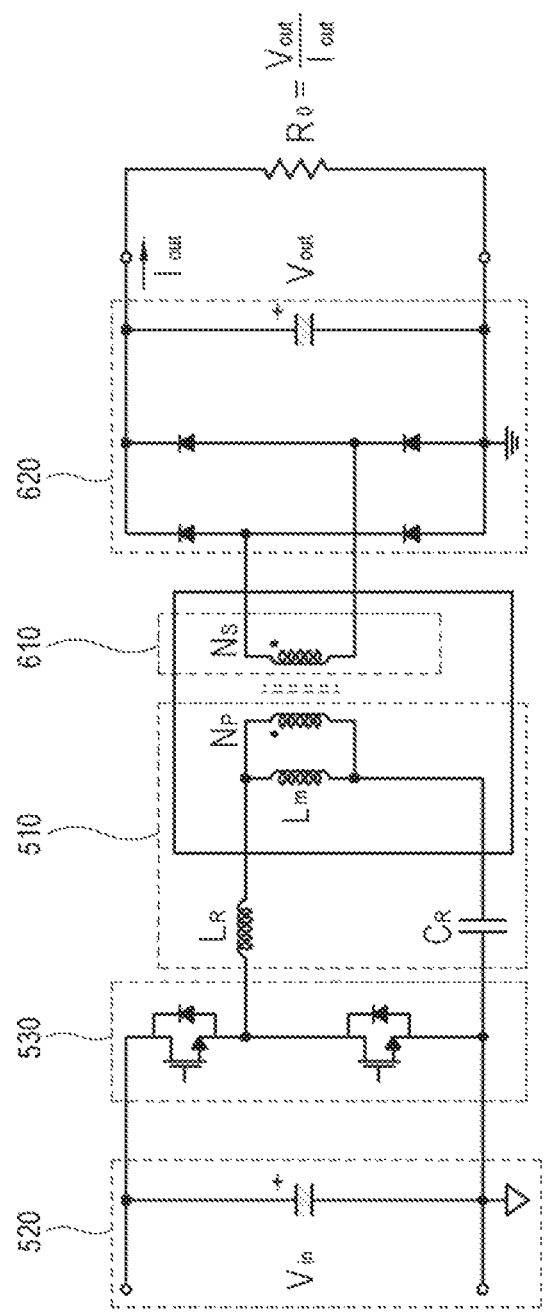
FIG. 6 is a circuit diagram showing an example of an LLC resonant converter applied to an electronic apparatus according to an embodiment of the disclosure.

FIG. 6 is a circuit diagram showing an example of the LLC resonant converter applied to an electronic apparatus according to an embodiment of the disclosure. The circuit diagram of FIG. 6 is an equivalent circuit of FIG. 3 achieved in the form of the LLC resonant converter.

The LLC converter circuit shown in FIG. 6 includes an inverter 530 configured to convert the DC power of an input portion 520 into AC power and supply the AC power to the primary resonator 110, a primary resonator 510 configured to resonate based on the operation of the inverter 530, a secondary resonator 610 configured to resonate with the primary resonator 510 and receive the AC power from the primary resonator 510, and a rectifying unit 620 configured to rectify the AC power received through the secondary resonator 610 and output DC power.

In the circuit shown in FIG. 6, the input portion 520, the inverter 530, the primary resonator 510, the secondary resonator 610 and the rectifying unit 620 are respectively equivalent to the input portion 120, the inverter 130, the primary resonator 110, the secondary resonator 210, and a rectifying unit 220, which are illustrated for the wireless power transfer in the electronic apparatus according to an embodiment of the disclosure shown in FIG. 3. Here, elements having similar names perform similar operations, and therefore redundant descriptions will be omitted.

In the resonator circuit with the primary and secondary resonators 510 and 620, as shown in FIG. 6, a resonant LLC converter including a resonance inductor $L_R$, a magnetized inductor $L_m$ of a transformer, and a resonance capacitor $C_R$ are applied. The resonance inductor $L_R$ may employ a transformer leakage inductance.

As shown in FIG. 6, the inverter 530 may be actualized by a half-bridge inverter circuit employing two switching devices (field effect transistors, FETs). Accordingly, a simple circuit configuration is enough to control the operation of the resonator for the wireless power transfer.

However, the inverter 530 is not limited to that shown in FIG. 6, but may for example be actualized by a full-bridge inverter circuit employing four or more switching devices (FETs).

In general, the LLC converter has a voltage gain varied depending on change in the operation frequency, and the voltage gain $G_{DC}$ may be obtained by the following Expression 1 based on fundamental harmonic approximation.

$$G_{DC} = \frac{Vout}{Vin} = \frac{G_{AC}}{2n} = \frac{1}{\left(2n\sqrt{\left\{1+\frac{1}{m}\left[1-\left(\frac{F_R}{F_S}\right)^2\right]\right\}^2 + \left[\left(\frac{F_S}{F_R}-\frac{F_R}{F_S}\right)\frac{\pi^2}{8n^2}Q\right]^2}\right)} \quad (1) \quad \text{[Expression 1]}$$

$$n = \frac{N_P}{N_S}, F_R = \frac{1}{2\pi\sqrt{L_R C_R}}, Q = \sqrt{\frac{L_R}{C_R}}\frac{1}{R_O}, m = \frac{L_m}{L_R}$$

In the Expression 1, $G_{DC}$ is a total voltage gain considering a turn ratio of a transformer including the primary and secondary resonators 510 and 610, and $G_{AC}$ is a resonance voltage gain of an LLC resonant converter. $F_R$ is a resonance frequency of a resonance inductor $L_R$ and a resonance capacitor $C_R$, and FS is a switching frequency of the inverter 530.

Figure 7:
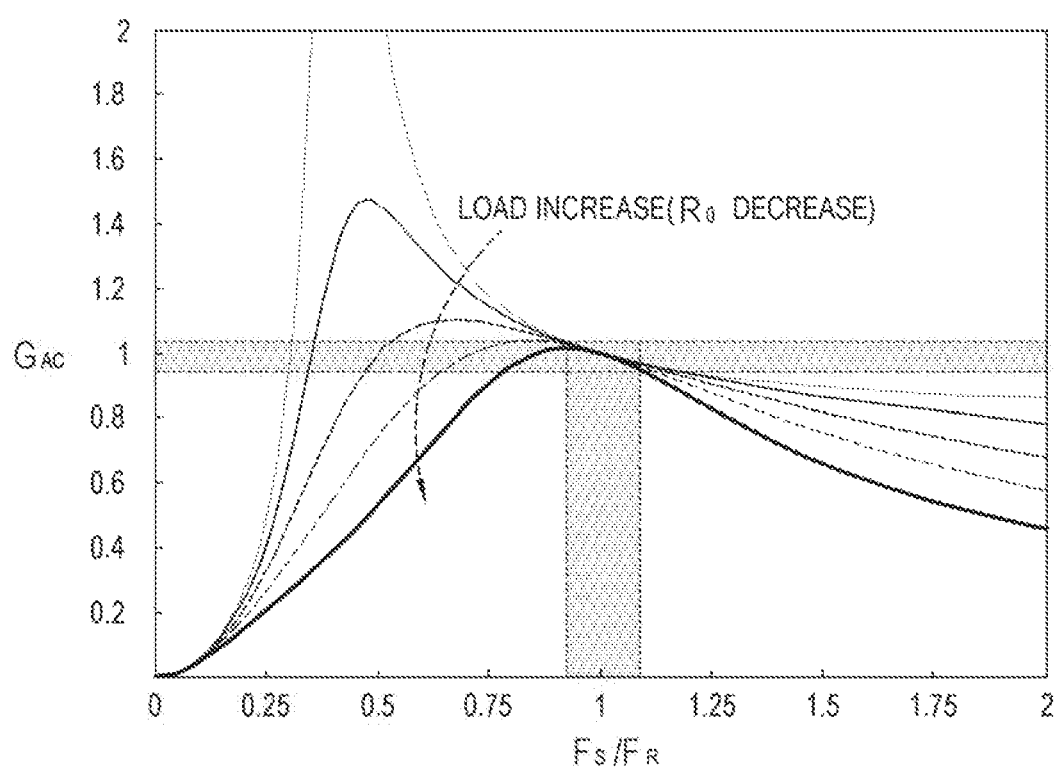
FIG. 7 is a graph showing a voltage gain of the LLC converter.

FIG. 7 is a graph showing a voltage gain of the LLC converter.

In general, the LLC resonant converter has a $G_{AC}$ of "1" when operating at the resonant frequency.

The resonance inductor $L_R$ and the resonance capacitor $C_R$ have values fixed after the circuit is designed. Therefore, in a general operation region, the voltage gain of the LLC converter decreases when the switching frequency $F_S$ becomes higher, and the voltage gain of the LLC converter increases when the switching frequency $F_S$ becomes lower, as shown in FIG. 7. Accordingly, the output voltage is adjusted by changing the switching frequency $F_S$ of the inverter.

When the foregoing LLC resonant converter operates at a frequency near the resonant frequency, that is, when $F_S/F_R$ approximates to "1" in FIG. 7, the output voltage gain is stable regardless of a load $R_O$.

Therefore, when the resonators 110 and 210 shown in FIG. 3 also operate at a preset frequency near the resonant frequency, the output voltage gain is kept constant and therefore stable power is wirelessly consistently transferred from the primary resonator 110 to the secondary resonator 210 without a separate feedback means.

The setting portion 140 outputs a signal (i.e. a set signal) for making the primary resonator 110 operate at the preset frequency to the inverter 130.

According to an embodiment, the preset frequency is identified as a frequency of a preset range corresponding to the resonant frequency. Here, the preset range may be a spread frequency band based on a spread spectrum of a resonant frequency. For example, the setting portion 140 identifies the operation frequency by applying the spread spectrum for shaking a little around the resonant frequency as the frequency of the preset range, thereby controlling the operation of the inverter 130.

In this case, the frequency change does not largely affect the operation of the LLC converter because frequency variation occurs around the resonant frequency, but makes the inverter 130 operate at a spread frequency, thereby having an expected effect on improvement in electromagnetic interference (EMI). Further, the setting portion 140 controls (e.g. increases or decreases) the amplitude and the duty of the operation frequency, thereby attenuating the ripple of the output voltage of the inverter 130.

According to an embodiment, the preset frequency is identified as a frequency invariable corresponding to the resonant frequency.

Referring to FIG. 3, the power receiver 200 provided in the main body 10 of the electronic apparatus further includes the rectifying unit 220 to rectify the AC power received from the secondary resonator 210 into DC power.

As shown in FIG. 3, the rectifying unit 220 may include a rectifier 221 to rectify the current of the secondary resonator 210, and a capacitor 222 to smooth the voltage passed through the rectifier 221. The rectifier 221 may be actualized by a rectifier circuit, a rectifying diode, or the like.

The DC power rectified in the rectifying unit 220 is supplied to a display 400 or other load.

Referring to FIG. 3, the electronic apparatus includes the loads such as a controller 300 configured to detect the voltage applied from the power transfer module 100 to the power receiver 200, and the display 400 configured to operate based on power supplied from the power receiver 200.

According to an embodiment, the controller 300 is placed in the main body 10 as shown in FIG. 3. However, the location of the controller 300 in the electronic apparatus according to the disclosure is not limited to that of FIG. 3, and therefore the controller 300 may for example be placed in the power transfer module 100.

In the electronic apparatus according to an embodiment of the disclosure, which employs the LLC resonant converter operating at the preset frequency corresponding to the resonant frequency, constant power is stably supplied from the primary resonator 110 to the secondary resonator 210 as described above. However, the voltage to be wirelessly transferred may be varied in level depending on a distance d between the primary and secondary resonators 110 and 210, alignment between the primary and secondary resonators 110 and 210, etc. To protect interior elements when the voltage is varied in level, the controller 300 is provided.

In the LLC resonant converter shown in FIG. 6, the output voltage is varied depending on the distance between the resonators 510 and 610.

Figure 8:
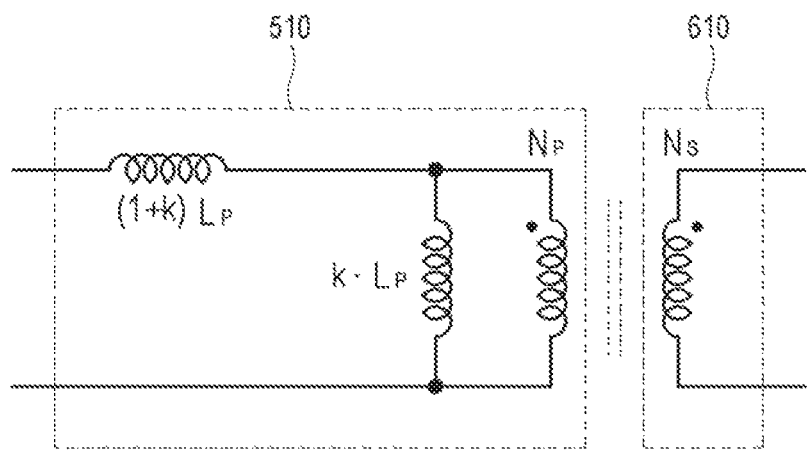
FIGS. 8, 9, and 10 are views for describing that a voltage level is varied depending on a distance from a resonator in the LLC resonant converter of FIG. 6.
Figure 9:
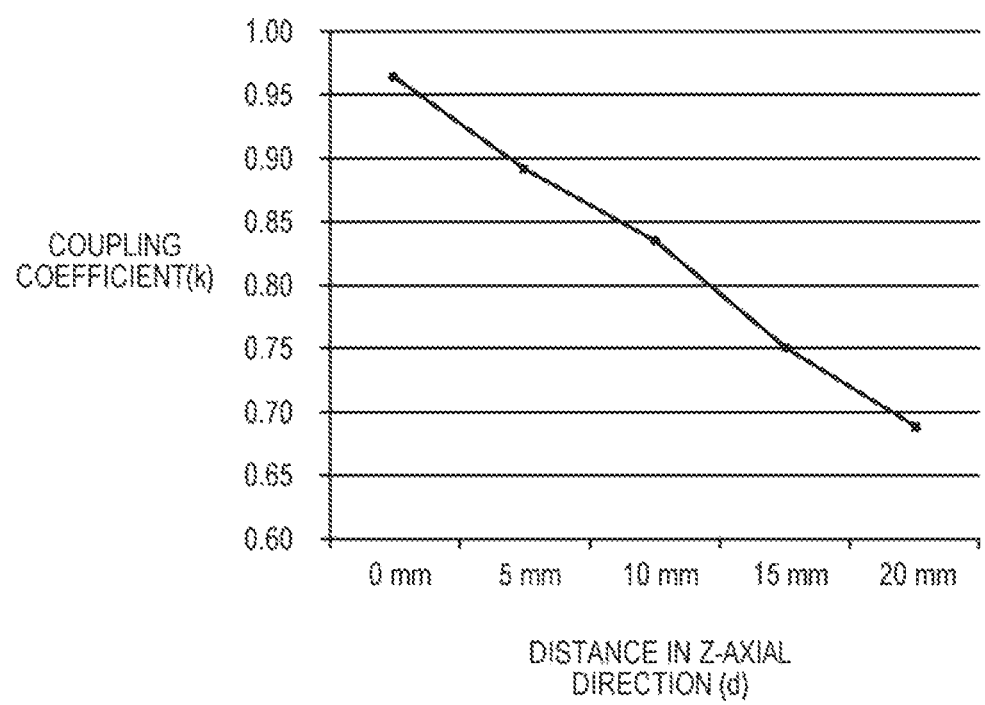
Figure 10:
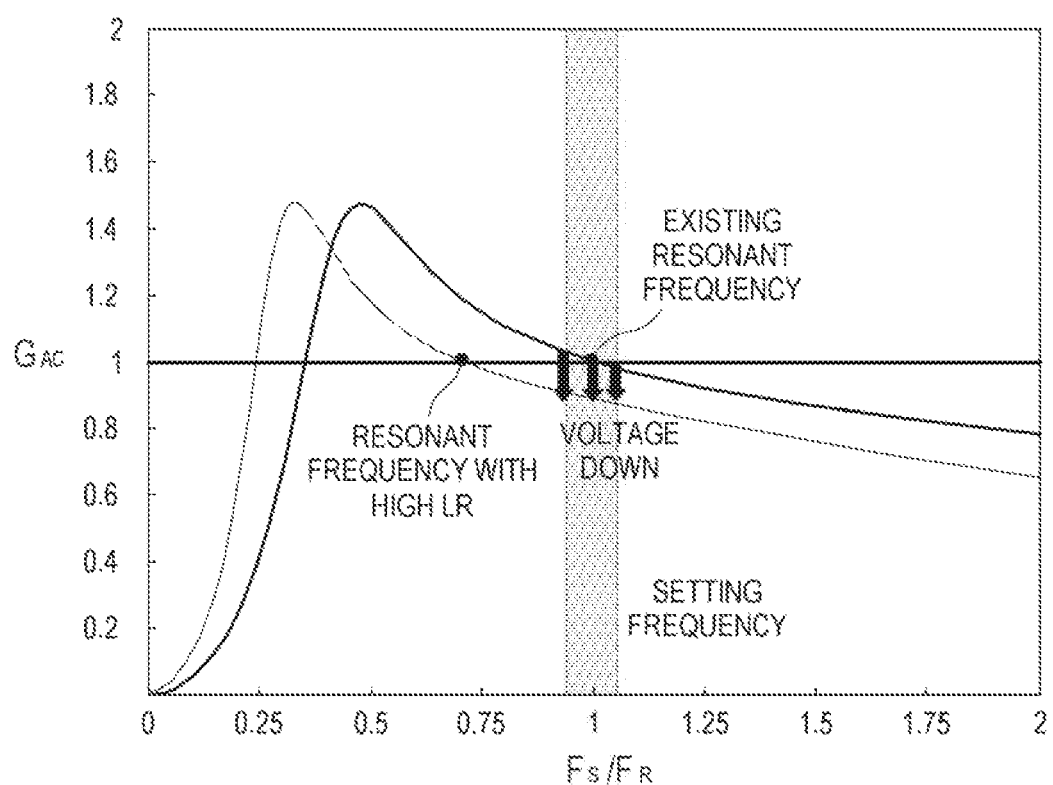

FIGS. 8, 9, and 10 are views for describing that a voltage level is varied depending on a distance from a resonator in the LLC resonant converter of FIG. 6.

The primary resonator 510 and the secondary resonator 610 of FIG. 8 are decreased in coupling between their wirings as shown in FIG. 9 when the distance d between them increases in the Z-axial direction as shown in FIG. 5 or when both resonators are misaligned in at least one direction of an X-axial direction and a Y-axial direction as shown in FIG. 5

When a coupling value, i.e. a coupling coefficient k of FIG. 9 decreases, a value of leakage inductance in the resonance increases as shown in FIG. 8. Here, the resonance capacitor $C_R$ has a fixed value regardless of the position of the resonator 510, and therefore the resonant frequency of the primary resonator 510 is lowered by the increased leakage inductance.

In this case, the primary resonator 510 operates at the frequency of the preset range, and therefore the voltage gain, i.e. the output voltage is decreased corresponding to change in the leakage inductance within the range of the operation frequency as shown in FIG. 10. Such a pattern of the output voltage is also applied to the resonators 110 and 210 provided in the electronic apparatus according to an embodiment of the disclosure shown in FIG. 3.

The primary and secondary resonators 110 and 210 are physically spaced apart at a certain distance because of their exterior casings in the power transfer module 100 and the main body 10, and installed to be aligned in the X- and Y-axial directions.

Here, the highest voltage gain is obtained at the minimum distance in the Z-axial direction between the primary and secondary resonators 110 and 210. Theoretically, the voltage of the receiver 200 does not rise greater than designed voltage level. Therefore, a separate means for overvoltage protection is unnecessary.

On the other hand, as described with reference to FIGS. 8 to 10, when distance between the transmitter 100 and the receiver 200 increases, i.e. the transmitter 100 and the receiver 200 are disposed apart from each other by distance greater than merely the exterior casings, the operation is controlled to decrease, i.e. lower the level of the voltage. Further, when the primary and secondary resonators 110 and 210 are misaligned, the level of the voltage is also lowered.

In the foregoing cases, the power to be supplied is equally maintained even though the level of the voltage applied from the transmitter 100 to the receiver 200 is lowered. To consistently supply the power from the transmitter 100 to the receiver 200 even when the level of the voltage to be wirelessly transferred is lowered, there is a need of increasing current. Accordingly, a problem may arise in that current stress of devices is increased more than necessary.

To solve this problem, the electronic apparatus according to an embodiment of the disclosure includes the controller 300 as a low-voltage protection circuit.

The controller 300 controls the power receiver 200 to operate and supply power to the display 400 or the like electronic component when the voltage transferred from the power transfer module 100 to the power receiver 200 is greater than or equal to a preset level. Thus, the devices of the receiver are protected by the low-voltage protection circuit.

Figure 11:
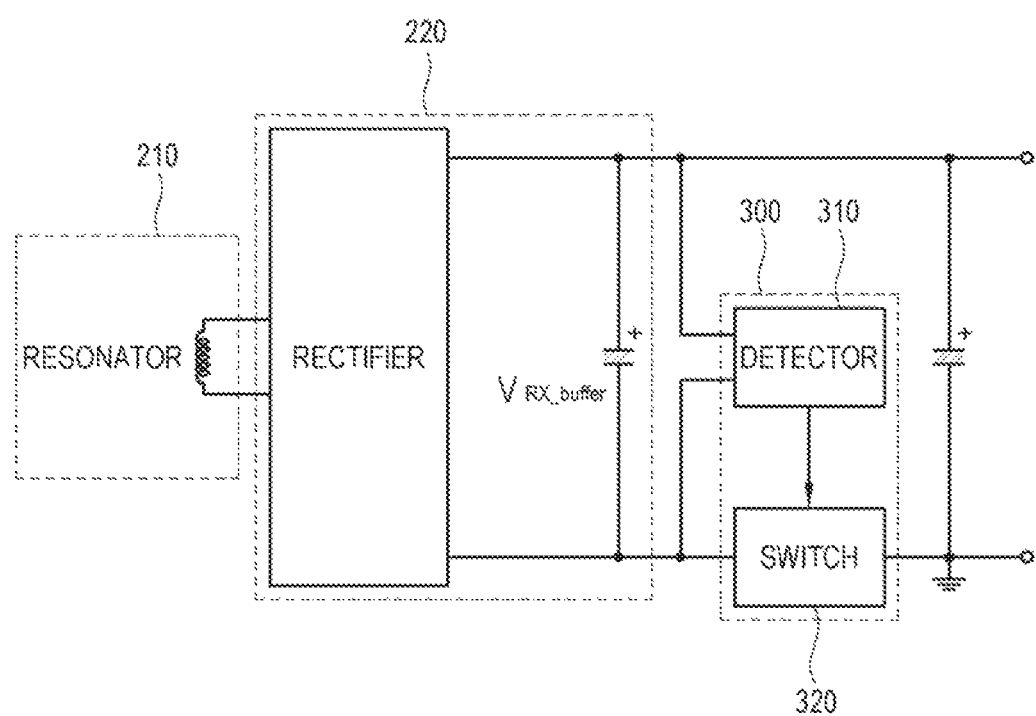
FIG. 11 is a view showing configuration of a controller provided in an electronic apparatus according to an embodiment of the disclosure.
Figure 12:
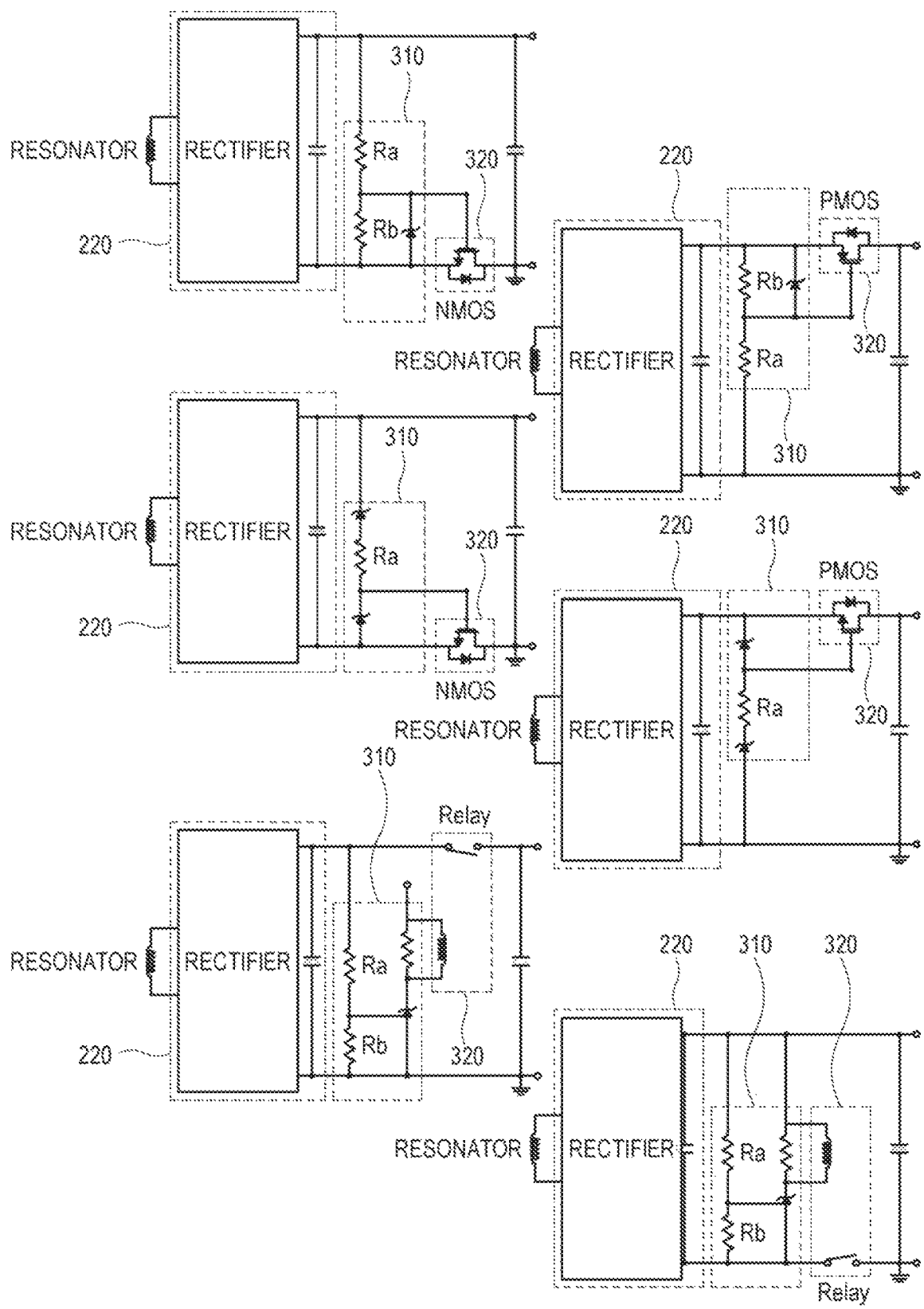
FIG. 12 illustrates example of a circuit diagram for the controller of FIG. 11.

FIG. 11 is a view showing configuration of a controller provided in an electronic apparatus according to an embodiment of the disclosure, and FIG. 12 illustrates example of a circuit diagram for the controller of FIG. 11.

According to an embodiment, the controller 300 includes a detector 310 that detects voltage, and a switch controlled to be turned on and turned off based on the detected voltage, as shown in FIG. 11.

The detector 310 detects the output voltage $V_{RX\_buffer}$ of the rectifying unit 220, and turns on the switch 320 so that voltage $V_{RX}$ can be transferred to the load when the detected voltage is greater than or equal to the preset level.

As shown in FIG. 12, the controller 300 may be actualized by various circuits to detect a voltage level and include a switching device being controlled to be turned on and turned off based on the detected voltage level.

Specifically, the detector 310 refers to a circuit that includes resistors and a diode to detect a voltage, in which the resistors $R_a$ and $R_b$ are designed to have sufficiently high values by taking standby power into account. The switch 320 to be turned on and turned off in response to the detected voltage level includes various switching devices such as a positive channel metal oxide semiconductor (PMOS), a negative channel metal oxide semiconductor (NMOS) and the like FET, a relay switch, etc.

By way of example, in the topmost circuit shown in FIG. 12, when the voltage $V_{Rx\_buffer}$ detected by the detector 310 is greater than or equal to the preset level, the gate of the FET, i.e. the switch 320 receives a voltage greater than or equal to a threshold level and thus outputs the voltage $V_{RX}$. The controller 300 controls the power receiver 200 by supplying the voltage $V_{RX}$ output as described above to the electronic components, i.e. the display 400 and the like loads.

Figure 13:
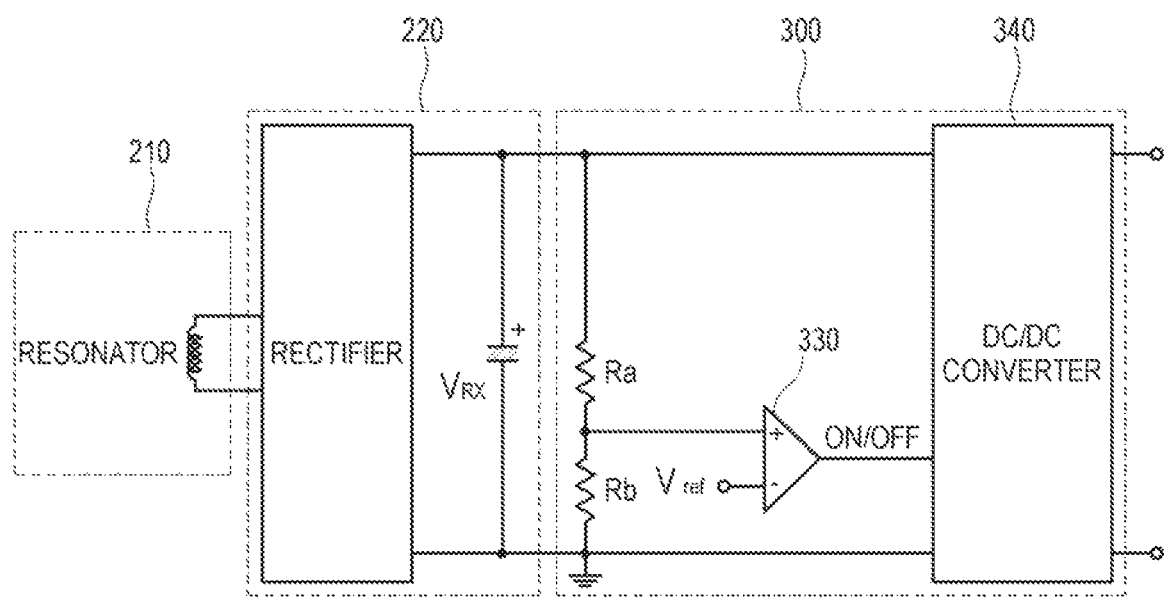
FIG. 13 is a view showing configuration of a controller provided in an electronic apparatus according to an embodiment of the disclosure.

FIG. 13 is a view showing configuration of a controller provided in an electronic apparatus according to another embodiment of the disclosure.

The controller 300 according to this embodiment shown in FIG. 13 includes resistors $R_a$ and $R_b$, a comparator 330 and a DC/DC converter 340, and the DC/DC converter 340 operates by the comparator 330 when the voltage $V_{RX}$ is greater than or equal to the preset level, thereby having a structure that power is transferred to the display 400 or load.

According to an embodiment, the controller 300 described with reference to FIG. 11 to FIG. 13 may further perform hysteresis control for stable operation.

The display 400 may for example be variously actualized by liquid crystal, plasma, a light emitting diode, an organic light emitting diode, a surface-conduction electron-emitter, a carbon nano-tube, nano-crystal, or the like display type without limitations. The display 400 may further include a driver as an additional element according to its type.

In the disclosure, the electronic component, i.e. the display 400, is described as an example of the load receiving power from the power receiver 200. However, the power receiver 200 may supply power to the display and also various elements (e.g. a mainboard, etc.) for performing operation in the electronic apparatus. Further, the power receiver 200 may supply power to a battery provided inside the main body 10 so that the battery can be charged by wireless power transfer.

In the foregoing electronic apparatus according to an embodiment of the disclosure, overcurrent caused by a circuit fault or the like may flow in the power transfer module 100 shown in FIG. 3, i.e. the transmitter.

The power transfer module 100 of the electronic apparatus according to an embodiment of the disclosure further includes an overcurrent detector for protecting the inverter 130 when the foregoing overcurrent occurs.

Figure 14:
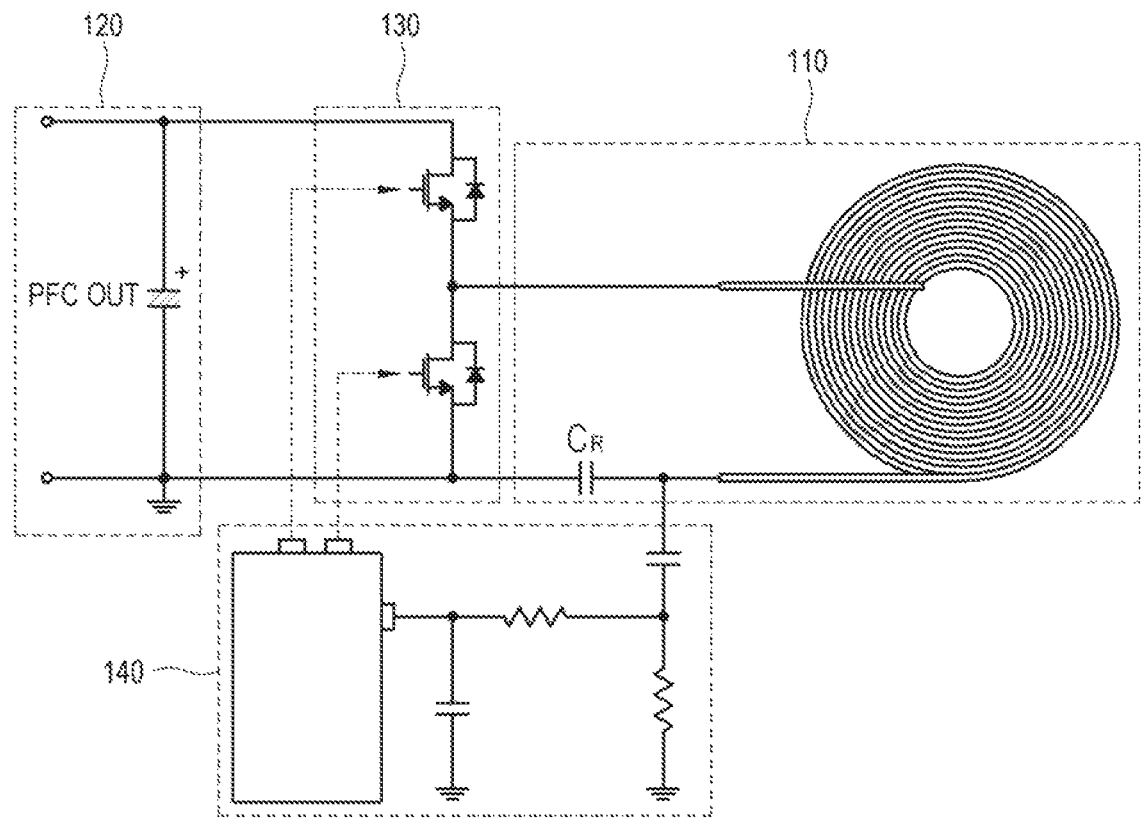
FIG. 14 is a view showing configuration of a transmitter overcurrent detector provided in an electronic apparatus according to an embodiment of the disclosure.

FIG. 14 is a view showing configuration of a transmitter overcurrent detector provided in an electronic apparatus according to an embodiment of the disclosure.

According to an embodiment, the overcurrent detector may be included in the setting portion 140 as shown in FIG. 14, and detect the resonance current of the primary resonator 110, thereby controlling the switching device of the inverter 130 to be turned off based on the detected current level and stopping the operation of the inverter 130. Accordingly, the devices are protected when an unexpected overcurrent occurs.

FIG. 14 illustrates an example of an overcurrent detection circuit for detecting a level of current flowing in the resonator 110 in the setting portion 140 for controlling the inverter 130. The overcurrent detection circuit is not limited to the example illustrated in FIG. 14. For example, various methods such as a method of using a resistor, etc. may be used to detect the level of the resonance current.

Meanwhile, as described above, in the electronic apparatus according to an embodiment of the disclosure, in which the power transfer module 100 is detachably mounted to the back of the main body 10, the power transfer module 100 is completely mounted to the main body 10 so that the secondary resonator 210 of the power receiver 200 can be positioned around the primary resonator 110, and then the wireless power transfer from the power transfer module 100 to the power receiver 200 is performed.

Figure 15:
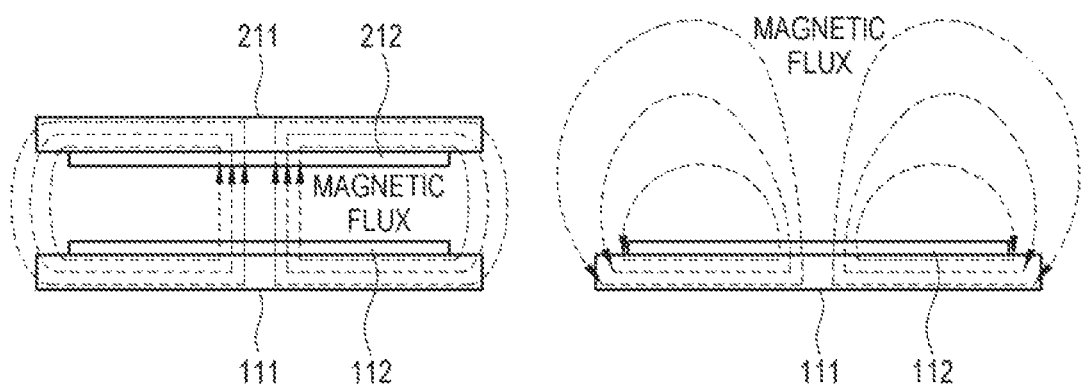
FIG. 15 is a view showing magnetic flux emitted from a primary resonator in an electronic apparatus according to an embodiment of the disclosure.

FIG. 15 is a view showing magnetic flux emitted from a primary resonator in an electronic apparatus according to an embodiment of the disclosure.

When a core 211 of the secondary resonator 210 of the power receiver 200 is not positioned around the primary resonator 110, the magnetic flux emitted from the power transfer module 100 radiates into a free space as shown in the right side of FIG. 15.

In this case, when the primary resonator 110 of the transmitter 100 continuously operates without performing the power transfer, the coil 112 of the primary resonator 110 is decreased in inductance and a level of circulating current is increased, thereby causing wasteful power consumption. Further, according to an embodiment of the disclosure, the operation based on the inductive coupling method between the primary and secondary resonators 110 and 210 does not need any separate wireless communication means, and therefore another apparatus which is not targeted for power transfer but is provided with a resonance means may be malfunction when positioned near the transmitter 100.

Figure 16:
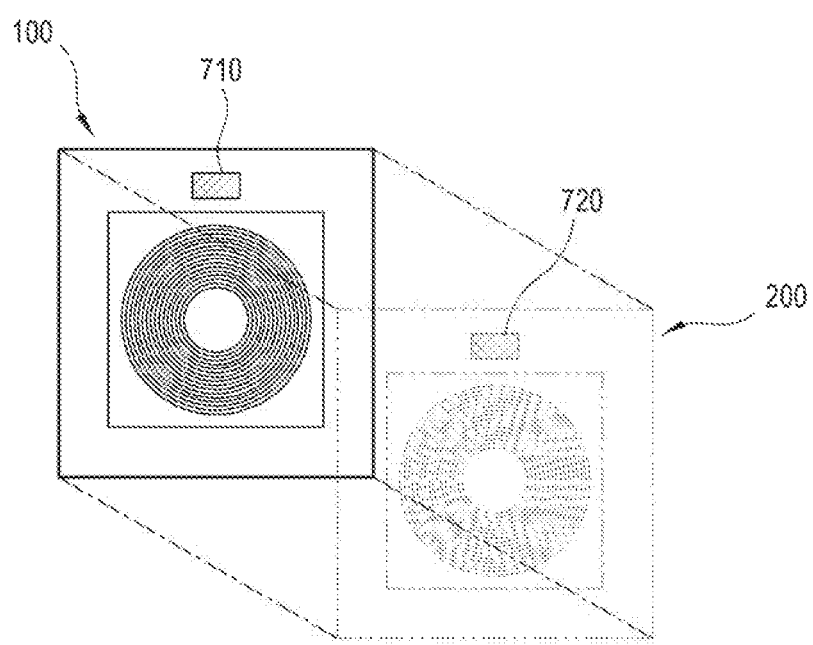
FIGS. 16 and 17 are views showing a transmitter and a receiver include an operation detector in an electronic apparatus according to an embodiment of the disclosure.
Figure 17:
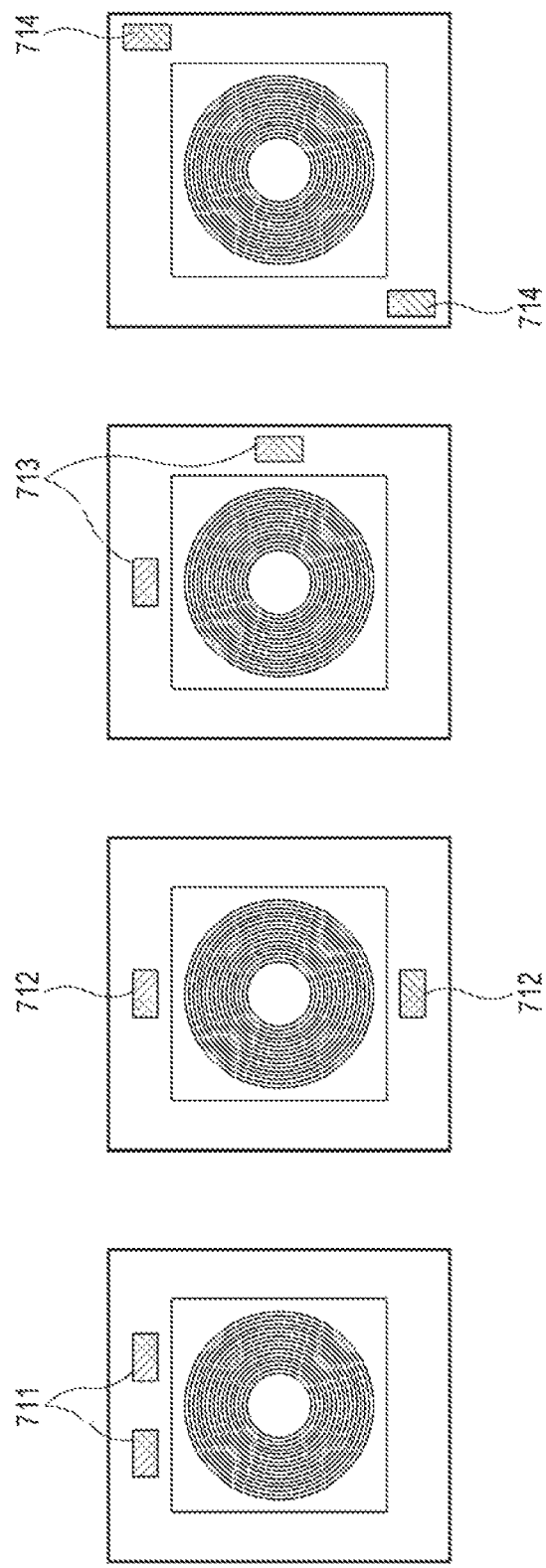

FIGS. 16 and 17 are views showing a transmitter and a receiver include an operation detector in an electronic apparatus according to an embodiment of the disclosure.

As shown in FIG. 16, operation detectors 710 and 720 are provided at opposing positions, i.e. at corresponding positional coordinates of the transmitter 100 and the receiver 200.

According to an embodiment, the operation detector 710 at the transmitter may be provided as a magnetic switch, and the operation detector 720 at the receiver may be provided as a magnet or a magnetic body capable of operating the magnetic switch. When the magnetism of the operation detector 720 at the receiver is detected, the operation detector 710 at the transmitter makes the inverter 130 operate so that power can be transferred from the power transfer module 100 to the power receiver 200. Here, the detection results of the operation detector 710 at the transmitter are transmitted to the setting portion 140, thereby controlling the inverter 130 to operate.

According to alternative embodiment, the operation detector 710 at the transmitter may be provided as a light receiving device of a photosensor, and the operation detector 720 at the receiver may be provided as a light emitting device (e.g., a light emitting diode, LED) of the photosensor. When a specific wavelength of the operation detector 720 at the receiver is detected, the light receiving device of the operation detector 710 at the transmitter makes the inverter 130 operate so that power can be transferred from the power transfer module 100 to the power receiver 200. Here, the detection results of the operation detector 710 at the transmitter are transmitted to the setting portion 140, thereby controlling the inverter 130 to operate.

FIG. 17 illustrates embodiments of a plurality of operation detectors 711, 712, 713 and 714 provided at the transmitter, and thus the opposite receiver also includes a plurality of operation detectors at corresponding positions. As shown in FIG. 17, in a case that two operation detectors are provided, the inverter 130 is controlled to operate when both two operation detectors 711, 712, 713 and 714 at the transmitter detect magnetism or a specific wavelength, thereby decreasing an operation error.

Accordingly, the wireless power transfer is performed when the transmitter and the receiver mutually detect presence of each other, thereby preventing wasteful power consumption or fault due to malfunction.

According to the disclosure, the number, position, shape, etc. of operation detectors are not limited to those described with reference to FIGS. 16 and 17. Alternatively, there may be used various sensors capable of performing switching to make the transmitter 100 operate when the receiver 200 is detected at a corresponding position.

In the foregoing electronic apparatus according to an embodiment of the disclosure, the primary resonator 110 and the secondary resonator 210 may be accurately aligned to accurately face each other to facilitate the power transfer between the transmitter and the receiver. When the facing areas of the power transfer module 100 and the power receiver 200 are small for various reasons, e.g. because of a product size, increased material costs, etc., bad alignment between the primary resonator 110 and the secondary resonator 210 may make power transfer difficult or may cause a low voltage at which power is not supplied to the display 400.

Figure 18:
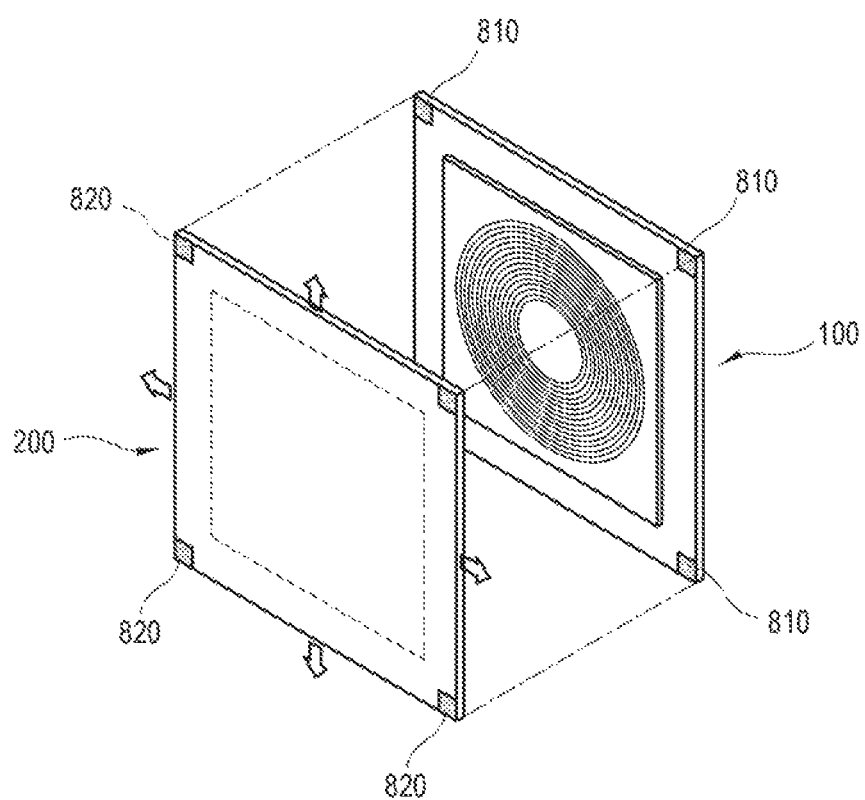
FIGS. 18, 19 and 20 are views showing examples that a transmitter and a receiver are provided with position alignment members in an electronic apparatus according to an embodiment of the disclosure.
Figure 19:
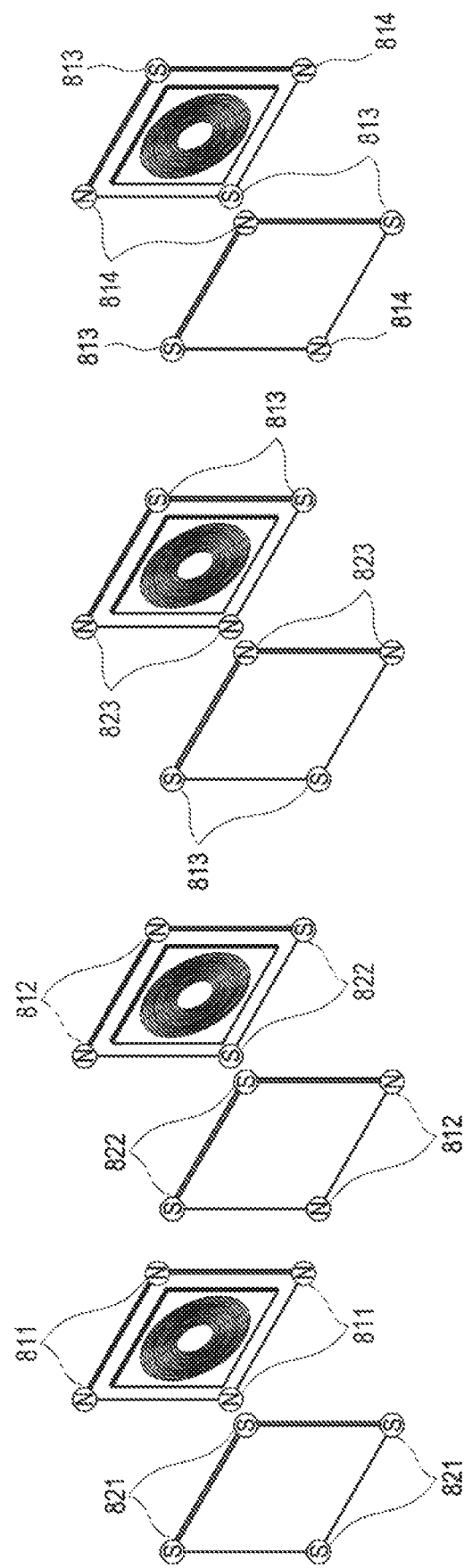
Figure 20:
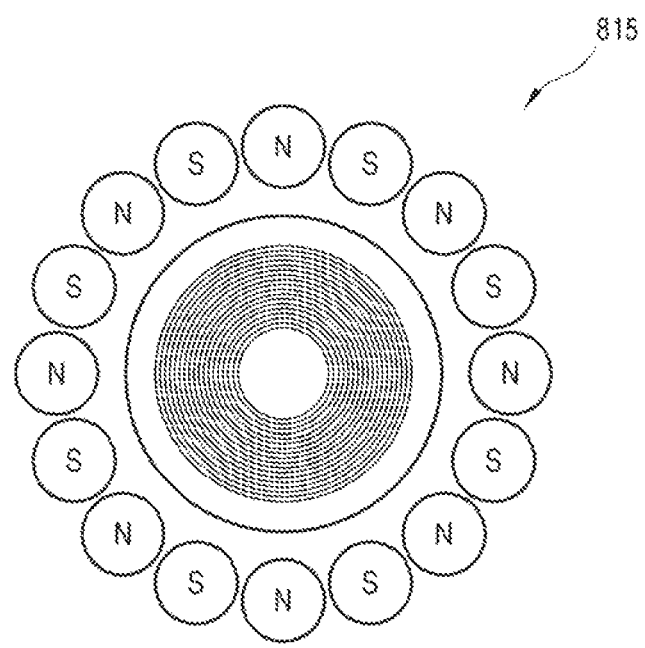

FIGS. 18 to 20 are views showing a transmitter and a receiver provided with position alignment members in an electronic apparatus according to an embodiment of the disclosure.

Position alignment members 810 and 820 are respectively provided in the power transfer module 100 and the power receiver 200, and may cause the primary resonator 110 and the secondary resonator 210 to be automatically aligned within a preset range when the power transfer module 100 is mounted to the main body 10. Thus, power transfer between the transmitter and the receiver is ensured, and convenience for a user is improved.

As shown in FIG. 18, the position alignment members 810 and 820 are installed at the opposing positions, i.e. the corresponding positional coordinates of the transmitter 100 and the receiver 200.

According to an embodiment, the transmitter position alignment member 810 and the receiver position alignment member 820 may be respectively actualized by magnets having different poles. Here, one or both of the power transfer module 100 and the power receiver 200 may be movable in up, down, left and right directions, so that correct alignment in the X-axial and Y-axial directions can be made by attraction between the position alignment members 810 and 820 positioned at the corresponding coordinates.

FIG. 19 illustrates various embodiments for arranging magnets of transmitter position alignment members 811, 812, 813 and 814 and receiver position alignment members 821, 822, 823 and 824.

When the magnets are arranged as shown in the rightmost side of FIG. 19, alignment of the power transfer module 100 and the power receiver 200 may be ensured by attraction and repulsion. However, when there is a need of pivoting (e.g. pivoting at 90 degrees) between the power transfer module 100 and the power receiver 200, the embodiment shown in the leftmost side of FIG. 19 may be better to maintain the attraction even though the power transfer module 100 and the power receiver 200 are pivoted with respect to each other.

In other words, the electronic apparatus according to an embodiment of the disclosure may select one of various embodiments shown in FIG. 19 for the automatic alignment between the transmitter 100 and the receiver 200 in accordance with installation conditions.

However, the arrangement for the magnets of the position alignment members 810 and 820 is not limited to those shown in FIGS. 18 and 19. Alternatively, the number, position, arrangement, etc. of magnets may be varied.

When the number of position alignment members increases, the alignment may be improved. For example, as shown in FIG. 20, many position alignment members 815 may be arrayed outside the primary resonator 110 of the transmitter. In this case, corresponding position alignment members may be also arrayed outside the secondary resonator 210 of the receiver for the attraction between the position alignment members of the first and secondary resonators 110 and 210.

In the disclosure, at least some magnets of the position alignment member may be replaced by a magnetic substance or an electromagnet attracted by the magnet. Further, an AC motor or the like electromotive means may be provided to automatically pivot at least one of the power transfer module 100 and the power receiver 200 and align the power transfer module 100 with the power receiver 200.

According to an alternative embodiment, without the automatic alignment structure described with FIGS. 18 to 20, the primary resonator 110 and the secondary resonator 210 may be designed to be different in size, so that magnetic flux can be smoothly formed even though the primary resonator 110 and the secondary resonator 210 are misaligned.

Figure 21:
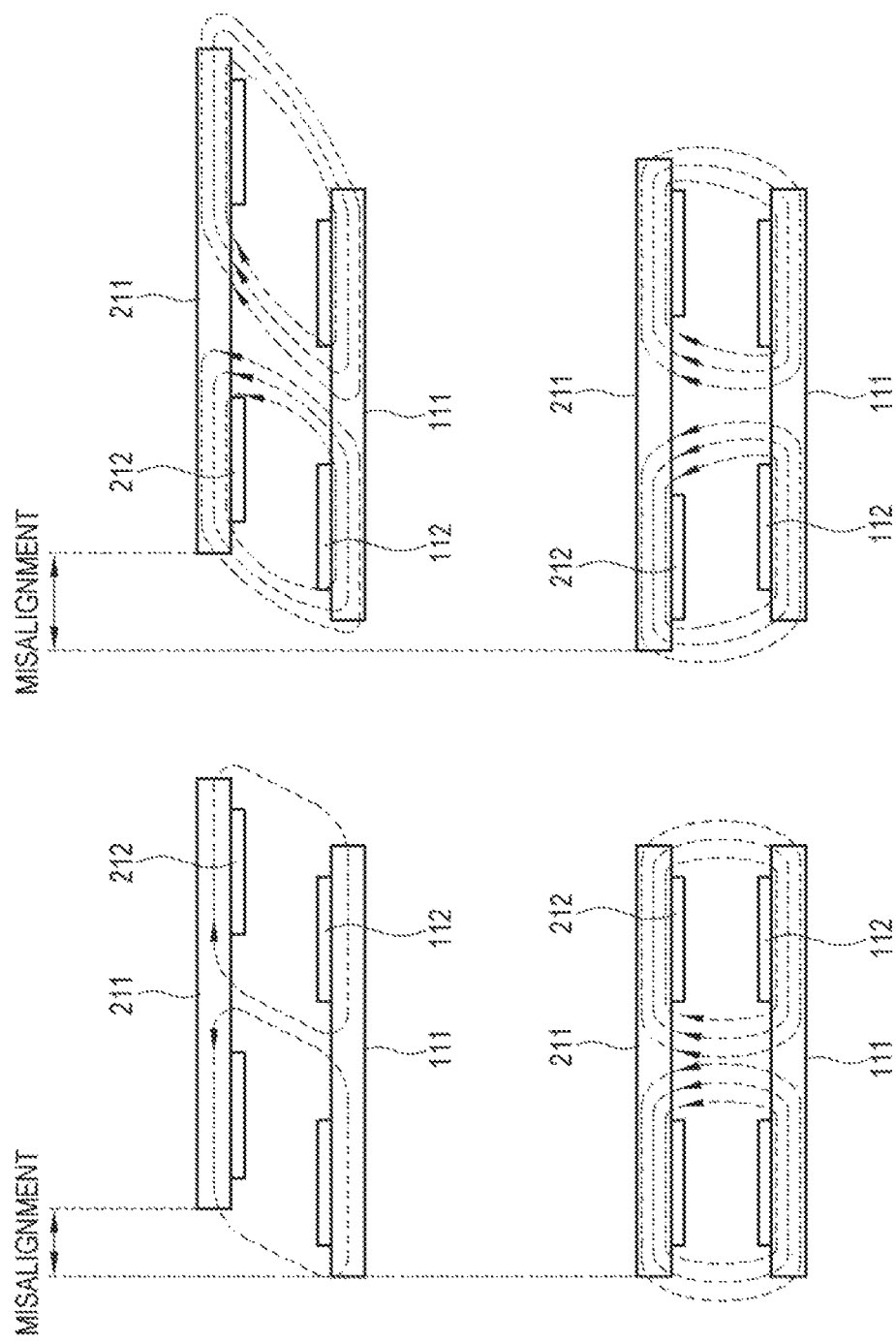
FIG. 21 illustrates variance in magnetic flux depending on a structure of primary and secondary resonators provided in an electronic apparatus according to an embodiment of the disclosure.

FIG. 21 illustrates variance in magnetic flux depending on a structure of primary and secondary resonators provided in an electronic apparatus according to an embodiment of the disclosure.

In a case of a loop-type coil, magnetic flux is generally formed inside the coil.

As shown in FIG. 21, when the misalignment is made in the X-axial or Y-axial direction, coupling between the coils is reduced because an effective inner area of the coil is decreased.

However, as shown in the right side of FIG. 21, when one of the resonators 210 is bigger than the other one, for example, when the core 211 of the secondary resonator 210 is bigger than the core 111 of the primary resonator 110, the number of coil turns is reduced by the big core 211, thereby increasing the inner area of the coil. Therefore, the magnetic flux is smoothly formed even though misalignment is made a between the primary resonator 110 and the secondary resonator 210, thereby facilitating the power transfer and enabling the wireless power transfer.

According to the disclosure, the primary resonator 110 and the secondary resonator 210 designed to be different in size are not limited to those shown in FIG. 21, but may have various structures as long as magnetic flux is smoothly formed even though the misalignment is slight between the resonator.

Figure 22:
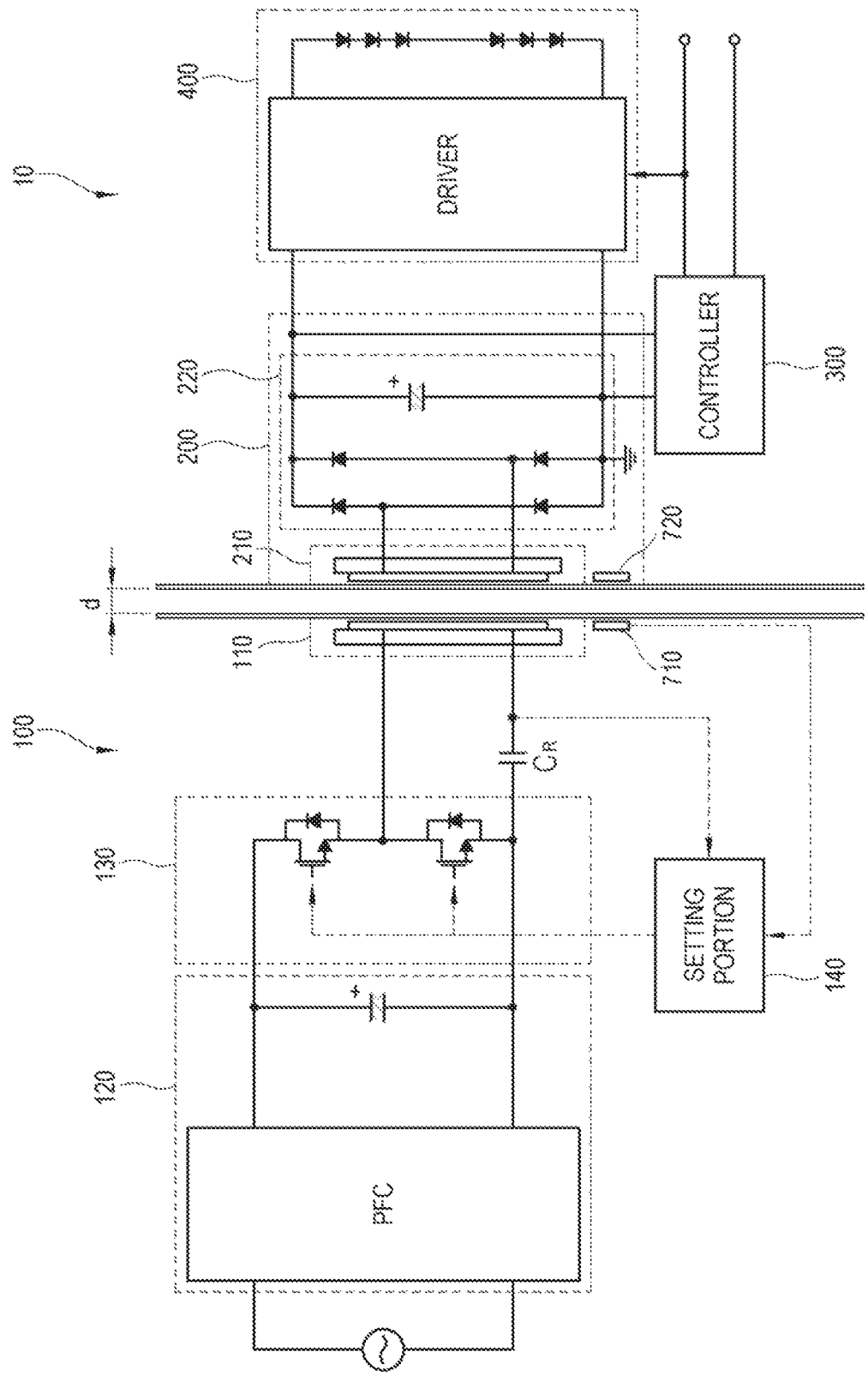
FIG. 22 illustrates an example that a power transfer module and a power receiver are applied to a display apparatus according to an embodiment of the disclosure.

FIG. 22 illustrates an example that a power transfer module and a power receiver are applied to a display apparatus according to an embodiment of the disclosure.

As shown in FIG. 22, the main body 10 includes the power receiver 200 including the secondary resonator 210 and the rectifying unit 220, the controller 300, and a load such as the display 400.

By the wireless power transfer method, the power receiver 200 receives power from the power transfer module 100 that includes the primary resonator 110 spaced apart at a certain distance d from the secondary resonator 210 provided inside the power receiver 200, the input portion 120, the inverter 130, and the setting portion 140.

Specifically, when the power transfer module 100 is mounted to the main body 10, a transmitter operation detector 710 detects the magnetism, wavelength, etc. of the receiver operation detector 720, thereby outputting the detection results to the setting portion 140.

The setting portion 140 controls the operation frequency to operate the inverter 130. Thus, the primary resonator 110 operates at a frequency of a preset range corresponding to the resonant frequency, thereby making the primary and secondary resonators 110 and 210 resonate with each other.

Here, to prevent the resonance current from largely increasing, i.e. overshooting, soft start control may be performed.

Based on the resonance between the primary and secondary resonators 110 and 210, power is induced in the secondary resonator 210, and thus power is wirelessly transferred from the power transfer module 100 to the power receiver 200.

The controller 300 detects voltage applied from the power transfer module 100 to the power receiver 200, and supplies power to the electronic components, i.e. the display 400, the mainboard, and the like load when the detected voltage is greater than or equal to a preset level. Here, the controller 300 first applies the power to the mainboard when the voltage of the power receiver 200 is greater than or equal to the preset level, and thus controls the driver of the display 400.

While performing the wireless power transfer, the setting portion 140 of the power transfer module 100 detects the resonance current of the primary resonator 100, and controls the inverter 130 to be turned off to protect the circuit when overcurrent is detected.

As described above, the electronic apparatus of the disclosure resonates with a preset frequency corresponding to a resonant frequency, and stably supplies power based on wireless power transfer without separate feedback means, thereby having advantages that circuitry is easy to design and manufacturing costs are reduced.

Further, according to the disclosure, power is transferred to the electronic component when voltage to be applied to the power receiver is greater than or equal to a preset level, thereby having an effect on preventing current stress from increasing even though voltage having a low level is supplied while consumption power is equally transferred by wireless power transfer.

Further, according to the disclosure, operation detectors provided in a power transfer module and a power receiver, and wireless power transfer is performed when the power transfer module and the power receiver mutually detect presence of each other, thereby preventing wasteful power consumption or fault due to malfunction.

Further, according to the disclosure, position alignment members for automatic alignment are provided in a power transfer module and a power receiver, thereby making power transfer between the transmitter and the receiver easy, and improving convenience for a user.

Further, according to the disclosure, a primary resonator and a secondary resonator are designed to be different in size, thereby having an effect on enabling wireless power transfer even though misalignment may exist.

Although a few embodiments have been shown and described, it will be appreciated by those skilled in the art that changes may be made in these embodiments without departing from the principles and spirit of the disclosure, the scope of which is defined in the appended claims and their equivalents.

What is claimed is:

1. An electronic apparatus comprising:
    a power transfer module configured to be attached to a main body of the electronic apparatus, and configured to receive alternating current (AC) power and wirelessly transfer power to the electronic apparatus, wherein the power transfer module comprises a primary resonator configured to operate at an operation frequency with a preset range corresponding to a resonant frequency;
    a power receiver comprising a secondary resonator configured to resonate with the primary resonator and wirelessly receive power from the power transfer module; and
    a controller configured to control the power receiver to supply power to an electronic component provided in the main body of the electronic apparatus based on voltage being greater than or equal to a preset level applied from the power transfer module to the power receiver and control the power receiver not to supply power to the electronic component based on voltage being less than the preset level applied from the power transfer module to the power receiver,
    wherein the preset range of the operation frequency corresponds to a spread frequency band based on a spread spectrum of the resonant frequency.

2. The electronic apparatus according to claim 1, wherein the primary resonator and the secondary resonator comprise LLC resonant converters.

3. The electronic apparatus according to claim 1, wherein the power transfer module further comprises:
    an inverter configured to operate at the frequency of the preset range and transfer power to the primary resonator; and
    a setting portion configured to output a signal for setting the operation frequency to the inverter.

4. The electronic apparatus according to claim 3, wherein the inverter comprises a plurality of switching devices configured to perform a switching operation based on the signal output from the setting portion, and control the primary resonator to resonate based on the switching operation.

5. The electronic apparatus according to claim 3, wherein the setting portion is configured to detect a resonance current of the primary resonator, and control operation of the inverter to be stopped based on detecting overcurrent being greater than or equal to a preset level.

6. The electronic apparatus according to claim 3, wherein the power transfer module further comprises an input portion configured to convert the AC power into direct current (DC) power by adjusting a power factor, and output the DC power to the inverter.

7. The electronic apparatus according to claim 1, wherein the power receiver further comprises a rectifying unit configured to convert the AC power received from the primary resonator of the power transfer module into direct current (DC) power to be supplied to the electronic apparatus.

8. The electronic apparatus according to claim 7, wherein the controller comprises:
    a detector configured to detect voltage output from the rectifying unit; and
    a switch configured to perform switching based on the voltage output from the rectifying unit being greater than or equal to the preset level.

9. The electronic apparatus according to claim 1, wherein the primary resonator and the secondary resonator are respectively provided at opposite positions inside external casings of the power transfer module and a main body of the electronic apparatus.

10. The electronic apparatus according to claim 9, wherein the power transfer module further comprises an operation detector configured to detect whether the secondary resonator is disposed at a position opposite to the primary resonator.

11. The electronic apparatus according to claim 10, wherein the operation detector comprises a magnetic switch or a light receiving element of a photosensor.

12. The electronic apparatus according to claim 9, wherein each of the power transfer module and the power receiver further comprises a position alignment member configured to make a relative position between the primary resonator and the secondary resonator be within a preset range when the power transfer module is mounted to the main body.

13. The electronic apparatus according to claim 12, wherein the position alignment member comprises a magnet.

14. The electronic apparatus according to claim 9, wherein each of the primary resonator and the secondary resonator further comprises a core and a wiring, and one of the primary resonator and the secondary resonator comprises a core larger than a core of another of the primary resonator and the secondary resonator.

15. An electronic apparatus comprising:
a power transfer module comprising a primary LLC converter circuit, the primary LLC converter circuit comprising:
an inverter configured to convert direct current (DC) power to alternating current (AC) power; and
a primary LLC resonant converter configured to resonate based on a switching frequency of the inverter;
a power receiver comprising a secondary LLC converter circuit, the secondary LLC converter circuit comprising:
a secondary LLC resonant converter configured to resonate with the primary LLC resonant converter and wirelessly receive the AC power from the primary LLC resonant converter; and
a rectifying unit configured to convert the AC power to DC power provided to an electronic component provided in a main body of the electronic apparatus; and
a controller configured to control the switching frequency of the inverter to operate at a resonant frequency of the primary LLC resonant converter, control the power receiver to supply power to the electronic component based on voltage being greater than or equal to a preset level applied from the power transfer module to the power receiver, and control the power receiver not to supply power to the electronic component based on voltage being less than the preset level applied from the power transfer module to the power receiver,
wherein the primary LLC resonant converter is configured to operate at an operation frequency with a preset range corresponding to a resonant frequency, wherein the preset range of the operation frequency corresponding to a spread frequency band based on a spread spectrum of the resonant frequency.

\* \* \* \* \*